United States Patent [19]

Scheuermann

[11] Patent Number: 4,525,844
[45] Date of Patent: Jun. 25, 1985

[54] METHOD FOR INTERCHANGING N PARTIAL BANDS

[75] Inventor: Helmut Scheuermann, Backnang, Fed. Rep. of Germany

[73] Assignee: Licentia Patent-Verwaltungs-GmbH, Frankfurt am Main, Fed. Rep. of Germany

[21] Appl. No.: 379,695

[22] Filed: May 19, 1982

[30] Foreign Application Priority Data

May 22, 1981 [DE] Fed. Rep. of Germany ....... 3120357

[51] Int. Cl.$^3$ .............................................. H04K 1/04
[52] U.S. Cl. ...................................... 375/2.1; 455/26; 179/1.5 S; 179/1.5 R
[58] Field of Search ............ 179/1.5 S, 1.5 R, 1.5 FS; 455/26; 375/2.1, 2.2

[56] References Cited

U.S. PATENT DOCUMENTS

| | | | |
|---|---|---|---|
| 3,649,915 | 4/1972 | Mildonian | 455/26 |
| 4,020,285 | 4/1977 | Branscome et al. | 179/1.5 S |
| 4,133,974 | 1/1979 | Morgan | 178/22.1 |
| 4,188,506 | 2/1980 | Schmid et al. | 179/1.5 S |
| 4,221,931 | 9/1980 | Seiler | 179/1.5 S |
| 4,232,194 | 10/1980 | Adams | 179/1.5 R |
| 4,343,967 | 8/1982 | McArdle | 179/1.5 R |
| 4,379,205 | 4/1983 | Wyner | 178/22.1 |
| 4,443,660 | 4/1984 | DeLong | 179/1.5 S |

FOREIGN PATENT DOCUMENTS

| | | | |
|---|---|---|---|
| 0065636 | 1/1982 | European Pat. Off. | 375/2.2 |
| 0065648 | 4/1982 | European Pat. Off. | 375/2.2 |
| 1273002 | 7/1968 | Fed. Rep. of Germany . | |
| 2359673 | 6/1975 | Fed. Rep. of Germany | 375/2.1 |
| 2652607 | 5/1978 | Fed. Rep. of Germany . | |
| 57113655 | 12/1980 | Japan | 375/2.1 |
| 767986 | 2/1980 | U.S.S.R. | 375/2.1 |

OTHER PUBLICATIONS

Wegener, W., "On the Design of Wave Digital Lattice Filters with Short Coefficient Word Lengths and Optimal Dynamic Range", IEEE Transactions on Circuits and Systems, vol. CAS-25, No. 12, pp. 1091–1098, Dec. 1978.

Ensslin, V. W., "Some Methods for Voice Encryption on Radio Lines", ETZ-B, vol. 14, H12, pp. 324–326, Jun. 11, 1962.

Hill, L. S., "Cryptography in an Algebraic Alphabet", Hunter College, Jun., Jul., 1929.

Saal et al., "On the Design of Filters by Synthesis", IRE Transactions on Circuit Theory, Dec. 1958.

Goldenberg et al., "Separation of Channels from a Baseband Digital Signal in a Pulse Code Modulation Frequency-Division System," Telecommunication & Radio Engineering, Jun. 1978, pp. 7–12.

T.A.C.M. Claasen et al., "A Generalized Scheme for an All Digital Time Division Multiplex to Frequency Division Multiplex Translator," IEEE International Conference on Communications, Jun. 1977, pp. 195–199.

Primary Examiner—Sal Cangialosi
Attorney, Agent, or Firm—Spencer & Frank

[57] ABSTRACT

A method for interchanging the frequency positions of n partial bands, each having a bandwidth b, of a signal frequency band, by the steps of: sampling signals in the frequency band at an input sampling rate; separating the sampled signals associated with each partial band into separate channels in stages in each of which sample signals are separated into high frequency and low frequency groups and the sampling rate is reduced; altering the positions of the channels in a scrambling matrix controlled by a random sequence generator; and spectrally recombining the signals in the separate channels into a signal extending across the signal frequency band.

6 Claims, 21 Drawing Figures

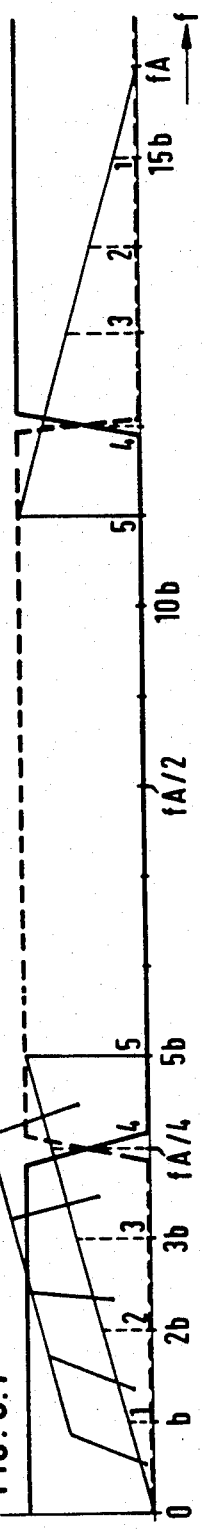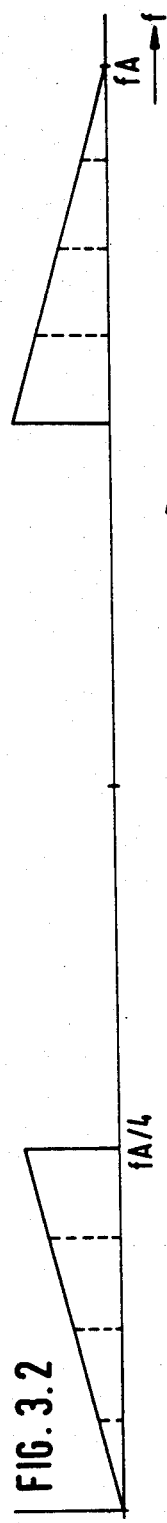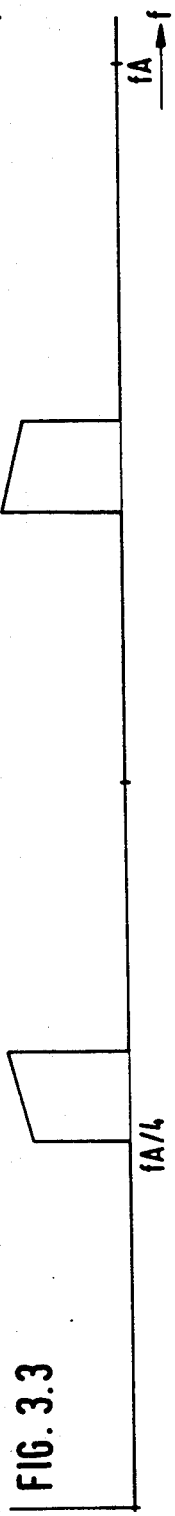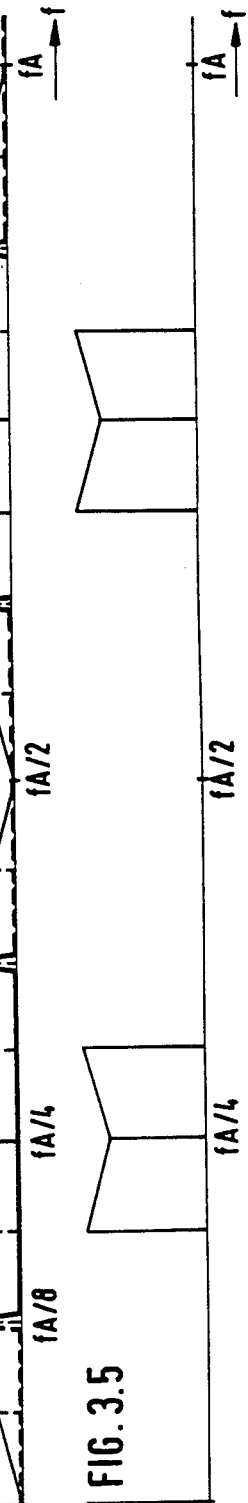
FIG. 3.1 FIG. 3.2 FIG. 3.3 FIG. 3.4 FIG. 3.5

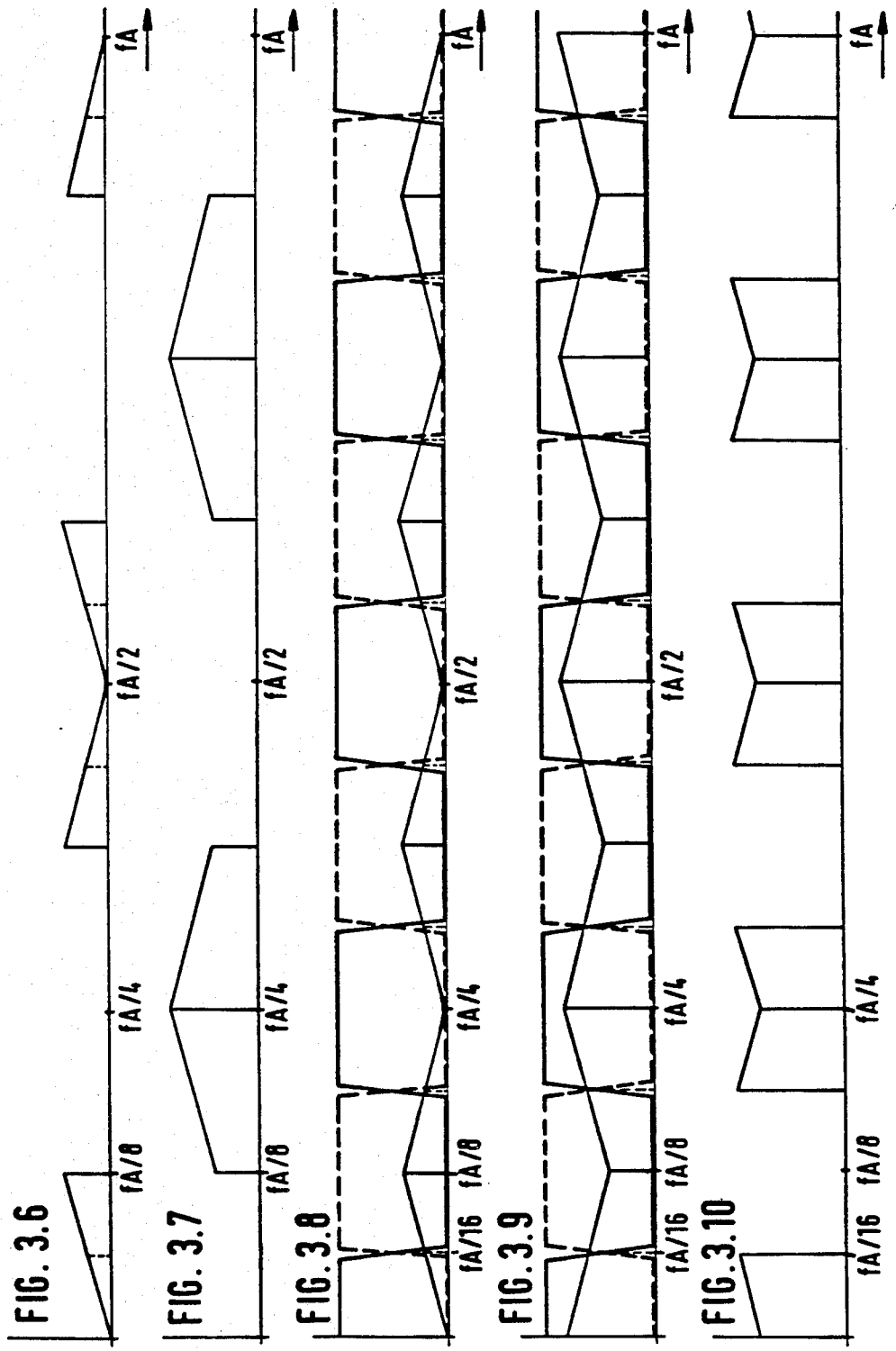

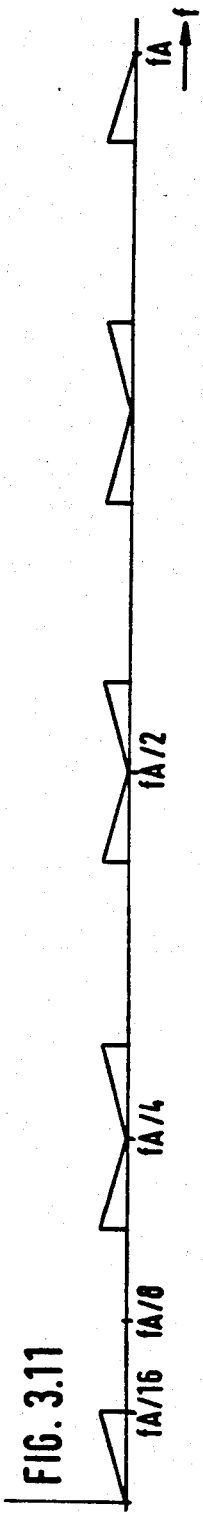
FIG. 3.11
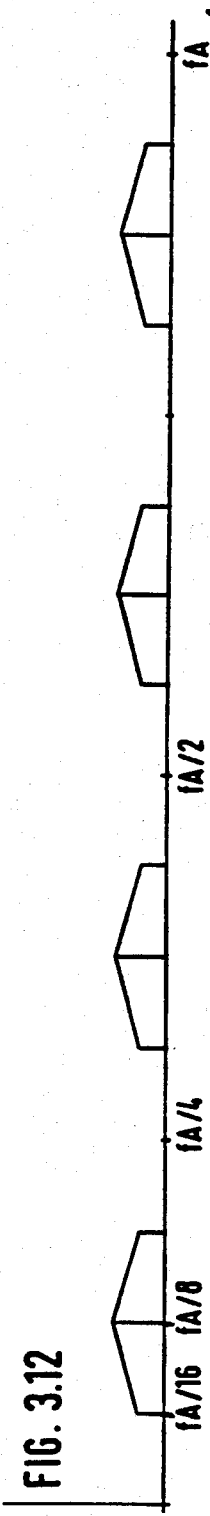
FIG. 3.12
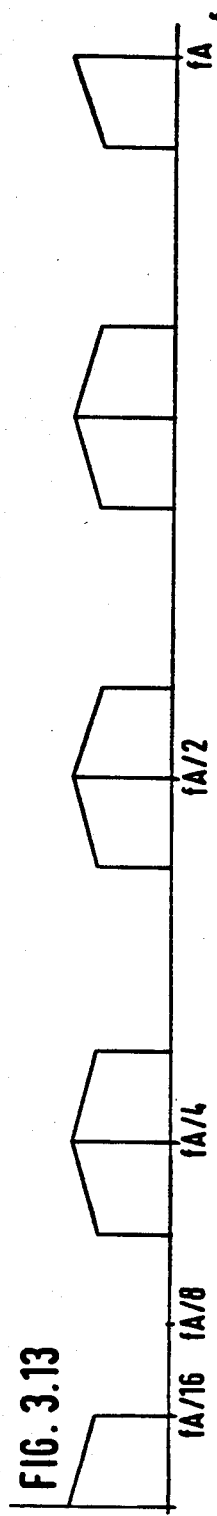
FIG. 3.13
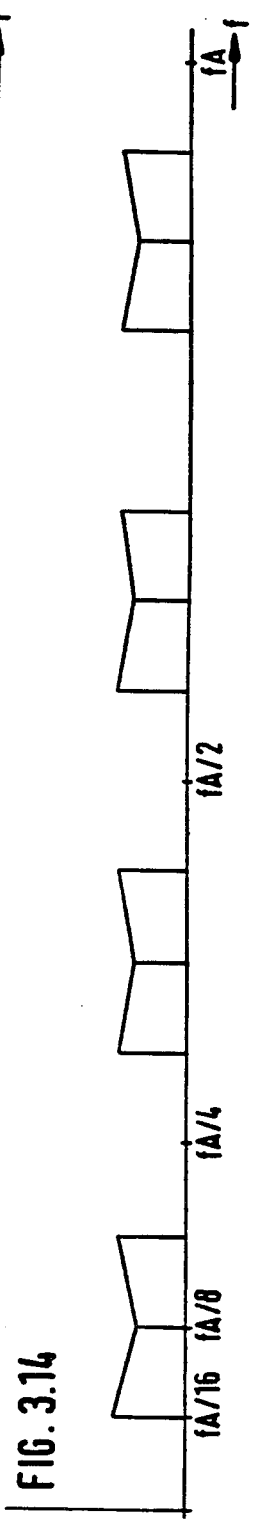
FIG. 3.14

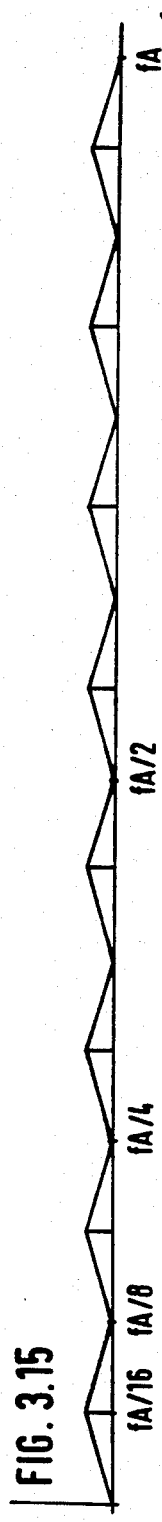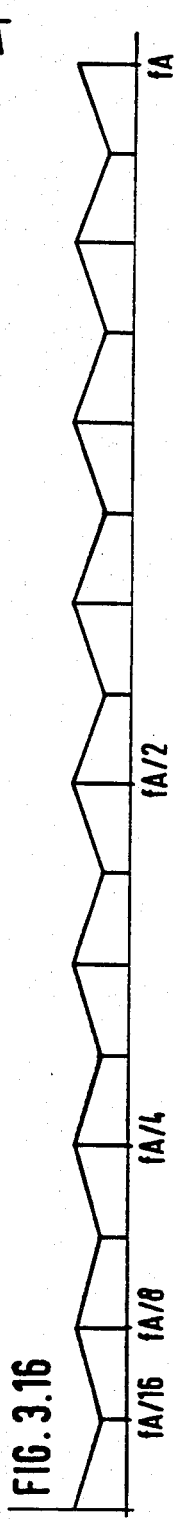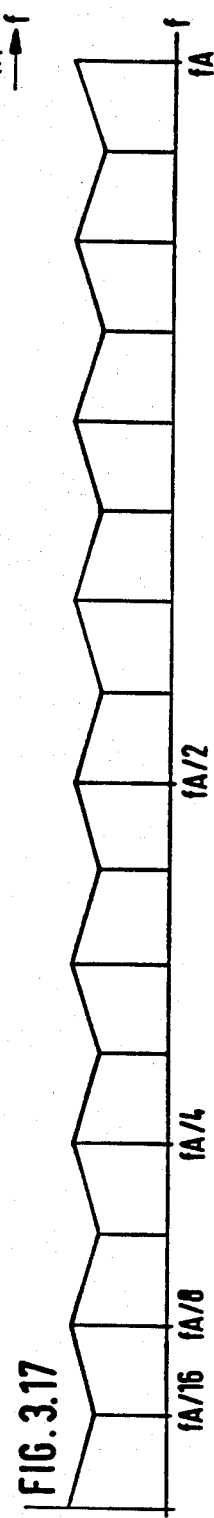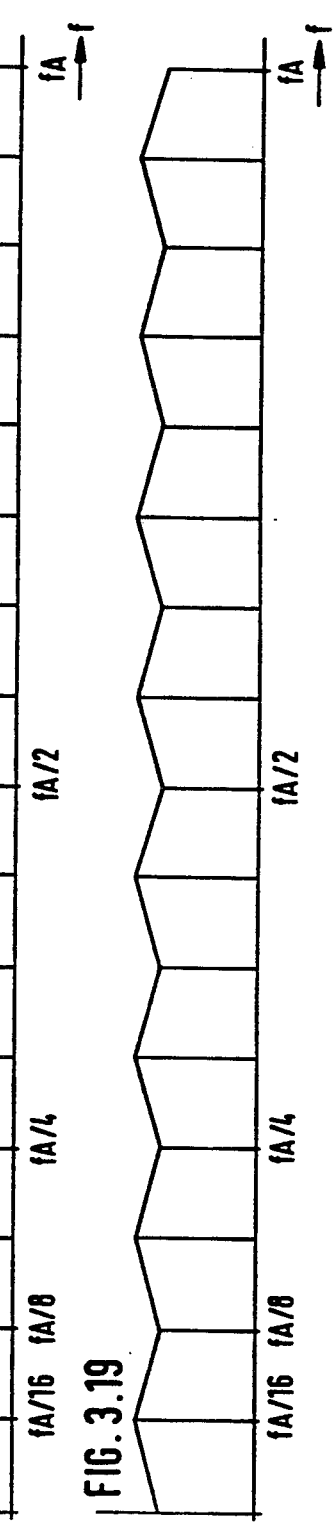
FIG. 3.15   FIG. 3.16   FIG. 3.17   FIG. 3.18   FIG. 3.19

METHOD FOR INTERCHANGING N PARTIAL BANDS

BACKGROUND OF THE INVENTION

The present invention relates to a method for interchanging n partial bands, or channels, of a signal frequency band.

Such methods are disclosed, for example, in German Offenlegungsschrift [Laid-Open Application] No. 2,652,607. When interchanging partial frequency bands, the complete signal frequency band is subdivided at the transmitting end into a plurality of equal-width, i.e. equal frequency range, partial bands which are interchanged by means of frequency converters. The interchange is controlled by a quasi random generator. At the receiving end the interchange is reversed with the aid of a generator which furnishes the same quasi random sequence.

The prior art band interchange method requires modulators.

SUMMARY OF THE INVENTION

It is an object of the present invention to provide a band interchange method which operates without modulators and is able to employ, in an economical manner, a plurality of identical or similar modules.

The above and other objects are achieved, according to the invention, by a method for interchanging the frequency positions of n partial bands, each having a bandwidth b, of a signal frequency band, which method includes sampling signals in the frequency band at an input sampling rate; separating the sampled signals associated with each partial band into separate channels in stages in each of which sample signals are separated into high frequency and low frequency groups and the sampling rate is reduced; altering the positions of the channels in a scrambling matrix controlled by a random sequence generator; and spectrally recombining the signals in the separate channels into a signal extending across the signal frequency band.

The method according to the invention can be employed to advantage for the encoded transmission of communications signals and requires no modulators for this purpose. It employs separating filters of completely identical design which are merely operated at different sampling rates.

By employing multiplex operation, it is possible to operate with but a single separating filter member, which results in space savings and reduced power loss.

By matching the sampling rate to the value given by the sampling theorem in the stages, a signal processing rate is realized which corresponds almost to the theoretical minimum. This results in reduced circuitry requirements compared to conventional solutions.

The process according to the invention is suitable for time discrete as well as for digital signal processing.

When digitalwave filters are used, the circuitry requirements become particularly favorable since these filters by nature exhibit a separating behavior.

According to a particular embodiment of the invention, the separating frequency transitions lie at a quarter of the respective sampling rate. In this case, the advantages of certain digitalwave filter structures can be utilized which additionally results in particularly favorable realization expenditures.

The method according to the invention will now be explained in connection with the drawing Figures.

BRIEF DESCRIPTION OF THE DRAWING

FIGS. 3.1 to 3.19 are signal vs. sampling rate illustrating the signals at corresponding points of the circuit of FIG. 2.

DESCRIPTION OF THE PREFERRED EMBODIMENTS

Figure 1:
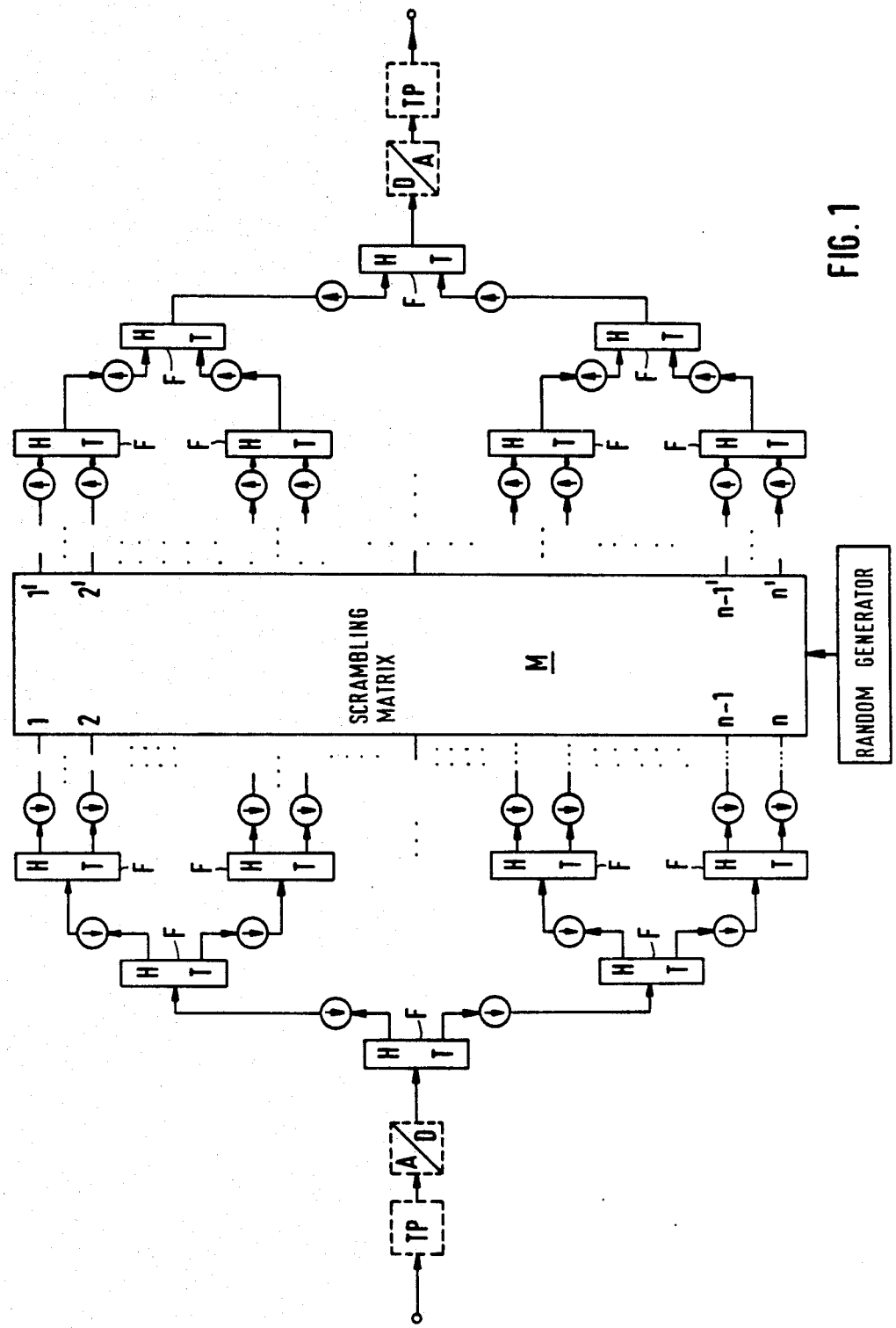
FIG. 1 is a simplified block circuit diagram of an embodiment of a circuit arrangement for n-band interchange according to the invention.
Figure 2:
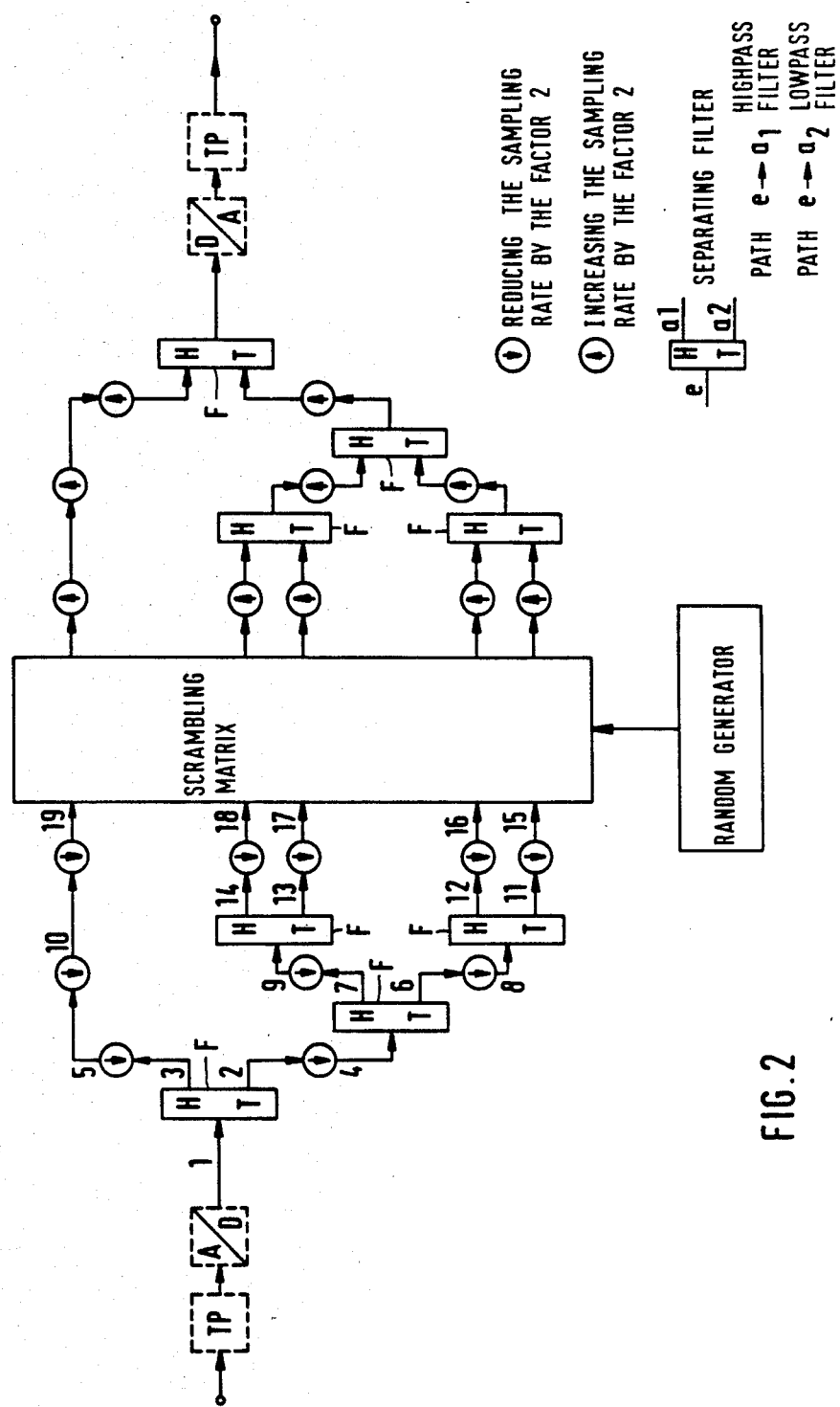
FIG. 2 is a block circuit diagram of an embodiment of a circuit arrangement for effecting a 5-band interchange according to the invention.

The circuit arrangement shown in FIG. 1, which can be used at the transmitting end as well as at the receiving end for n-band interchange, has, at its input end, a lowpass filter TP and an analog/digital converter A/D, operating at a sampling rate fA and connected to separating filters F that branch out in a tree structure and divide the signal frequency band into individual partial bands by continuous, simultaneous lowpass and highpass filtering. After each filtering stage, the sampling rate is reduced. This is indicated in FIGS. 1 and 2 by the circles enclosing a downwardly pointing arrow.

Since the sampling rate is thus reduced in stages, it is always adapted to the bandwidth of the remaining signal at the filter outputs in that, particularly if n is a power of 2, i.e. $n=2^r$ where $r=1, 2, 3 \ldots$, the sampling theorem is just met.

The sampling theorem states as follows: it signal with bandwidth o to f max is described exactly by its samples if it is sampled at least twice the maximum signal frequency f max.

The tree or root-like branching arrangement produces the individual partial bands at the n outputs of the last stage and these partial bands are applied to the inputs 1 to n of a scrambling matrix M where they are interchanged to correspond to the random sequences produced by a random or pseudorandom sequence generator. The scrambled partial bands appearing at the outputs 1' through n' of matrix M are then spectrally summed in that the sampling frequency is increased before each stage of separating filters, as indicated by the circles enclosing an upwardly pointing arrow. This summing occurs in symmetry with the separation at the input. This matrix M is controlled by the output of the random generator to vary the connection pattern between inputs 1 . . . n, on the one hand, and outputs 1' . . . n', on the other hand. The n-band interchanged signal appearing at the output of the last filter stage is converted to the corresponding analog signal by means of digital/analog converter D/A and a subsequent lowpass filter TP.

FIG. 2 shows a circuit arrangement similar in principle to the circuit arrangement of FIG. 1 for the special case where n=5 partial bands each having a frequency bandwith b and occupying the signal frequency range from 0 to 5b. This results in an economically constructed circuit arrangement in that the sampling frequency is reduced each time by the factor 2 which does not require a separate device but employs merely every other sampling value produced in the preceding stage for further signal processing and in that the separating transitions between high and low pass bands are designed in such a manner that they occur at frequencies corresponding to multiples of a quarter of the sampling rate. The numbered inputs and outputs of the separating filters correspond to the identical subnumbers of FIG. 3 where the associated frequency schemes are shown.

If the lower frequency limit of the frequency band has some value fu greater than zero, the initial sampling rate fA can have the value $4(fu+2\mu_o \cdot b)$, where $\mu_o$ is the highest power of 2 contained in, but not including, n. Separation is then performed in $1+\log_2 2\mu_o$ stages by means of n-1 filters, and the sampling rate is reduced at each stage by the factor $2\mu_o \cdot b$ divided by a multiple of 2.

When fu is zero, the initial sampling rate, fA can be made equal to $8 \cdot \mu_o \cdot b$.

In the case of n to the power of 2 only $\log_2 n/2$ stages are needed to separate and therefore no results in the highest power of 2 contained in, but not including, n.

The two analog lowpass filters are conventional inductor-capacitor filters, for example, which may be designed according to "On the Design of Filters by Synthesis", IRE Trans. CT-4, 1958, pp. 284–327, by R. Saal and E. Ulbrich. Suitable embodiments for A/D- and D/A-convertors are AD ADC 80 and AD DAC 80, respectively, from Analog Devices, Inc.

A suitable embodiment for the identical separating filters F is described in "On the Design of Wave Digital Lattice Filters with Short Coefficient Word Length and Optimal Dynamic Range", IEEE Trans. on Circ. and Syst., Vol. CAS-25, No. 12, Dec. 1978, pp. 1091–1098, by W. Wegener.

The scrambling matrix is a matrix as described in L. S. Hill: "Cryptography in an algebraic alphabet, The American Mathematical Monthly, Vol. 36, June–July 1929 pp. 306–312". Suitable implementations may be found in German Auslegeschrift No. 273002, in "Einige Verfahren der Sprachverschlüinsselung auf Finklinien", ETZ-B, Bd 14, H12, Juni 62, pp. 324–326, by W. Ensslin, and other publications.

A suitable embodiment for the random generator is described in U.S. Pat. No. 4,133,974.

In FIG. 3 the frequency spectra corresponding to FIG. 2 are drawn. The numbers 1 to 19 in FIG. 2 refer to the FIGS. 3.1 to 3.19, respectively. In the FIGS. 3.1 to 3.19 the thick solid line symbolically shows the modulus of the transfer function of the lowpass branch and the thick broken line the modulus of the complementary transfer function corresponding to the highpass branch of the particular filter F. In FIG. 3.1 the spectrum of the signal to be band-interchanged is symbolically indicated by a triangular form facilitating the distinction between the five partial band signals indicated by small vertical broken lines. The FIGS. 3.1 to 3.19 in detail show the functioning of the band separation and is self-explanatory.

It will be understood that the above description of the present invention is susceptible to various modifications, changes and adaptations, and the same are intended to be comprehended within the meaning and range of equivalents of the appended claims.

What is claimed is:

1. A method for interchanging the frequency positions of n partial bands, each having a bandwidth b, of a signal frequency band, comprising: sampling signals in the frequency band at an input sampling rate equal to $fA=4(fu+2\mu_o \cdot b)$ where fu is the lower limit frequency of the signal frequency band, and $\mu_o$ is the highest power of two contained in, but not including, n; separating the sampled signals associated with each partial band into separate channels in stages in each of which sample signals are separated into high frequency and low frequency groups and the sampling rate is reduced; altering the positions of the channels in a scrambling matrix controlled by a random sequence generator; and spectrally recombining the signals in the separate channels into a signal extending across the signal frequency band, wherein said step of separating is performed in $1+\log_2 2\mu_o$ stages by means of n−1 filters connected in a tree structure to each effect one separation to provide n partial band outputs, with the sampling rate being reduced each time by the factor $2\mu_o \cdot b$ divided by a multiple of 2, and each filter separates signals at opposite sides of a transition frequency which is one-fourth of the associated sampling rate.

2. A method as defined in claim 1 wherein said step of recombining takes place in stages constituting a sequence which is the reverse of that constituting said separating step, with the sampling rate increasing in each stage, and is performed with combining filters.

3. Method as defined in claim 1 wherein said step of separating is performed to separate the sampled signals into the n associated partial bands, and said step of recombining is carried out by conducting the signals in each channel from the matrix through a respective band pass filter having a pass band corresponding to a respective partial band.

4. Method as defined in claim 1 wherein said step of recombining takes place in stages constituting a sequence which is the reverse of that constituting said separating step, with the sampling rate increasing in each stage, and is performed with combining filters, the frequency range of the lowest partial band also includes the frequencies between 0 and fu, the lower limit frequency fu is an integer multiple of the frequency bandwidth b, the sampling rate is reduced in each stage by a factor of 2 during said step of separating and is increased in each stage by a factor of 2 during said step of recombining.

5. Method as defined in claim 4 wherein each said filter is a digitalwave filter.

6. Method as defined in claim 1 wherein each said filter is a digitalwave filter.

* * * * *